United States Patent
Franz et al.

(10) Patent No.: US 10,872,094 B2
(45) Date of Patent: Dec. 22, 2020

(54) HIERARCHICAL COMPUTATIONS IN RELATIONAL DATABASE MANAGEMENT SYSTEMS

(71) Applicant: SAP SE, Walldorf (DE)

(72) Inventors: Gerald Franz, Walldorf (DE); Hannes Jakschitsch, Walldorf (DE); Roland Sedler, Leimen (DE); Bastian Erler, Walldorf (DE)

(73) Assignee: SAP SE, Walldorf (DE)

( * ) Notice: Subject to any disclaimer, the term of this patent is extended or adjusted under 35 U.S.C. 154(b) by 570 days.

(21) Appl. No.: 15/364,205

(22) Filed: Nov. 29, 2016

(65) Prior Publication Data

US 2018/0150535 A1    May 31, 2018

(51) Int. Cl.
| | |
|---|---|
| *G06F 16/25* | (2019.01) |
| *G06F 16/22* | (2019.01) |
| *G06F 16/21* | (2019.01) |
| *G06F 16/248* | (2019.01) |
| *G06F 16/2457* | (2019.01) |

(52) U.S. Cl.
CPC .......... *G06F 16/258* (2019.01); *G06F 16/211* (2019.01); *G06F 16/22* (2019.01); *G06F 16/248* (2019.01); *G06F 16/24578* (2019.01)

(58) Field of Classification Search
CPC .... G06F 16/2246; G06F 16/258; G06F 16/22; G06F 16/211; G06F 16/248; G06F 16/24578
See application file for complete search history.

(56) References Cited

U.S. PATENT DOCUMENTS

| | | | | |
|---|---|---|---|---|
| 6,625,615 | B2 * | 9/2003 | Shi | H04L 29/12009 |
| 6,704,736 | B1 * | 3/2004 | Rys | G06F 16/30 |
| 9,891,801 | B2 * | 2/2018 | Roesch | G06F 3/04842 |
| 10,157,201 | B2 * | 12/2018 | Chang | G06F 16/243 |
| 2005/0198017 | A1 * | 9/2005 | Gaponoff | G06F 16/2246 |
| 2006/0173873 | A1 * | 8/2006 | Prompt | G06F 16/258 |
| 2009/0006314 | A1 * | 1/2009 | Balmin | G06F 16/835 |
| 2014/0304266 | A1 * | 10/2014 | Leuoth | G06F 16/22 |
| | | | | 707/737 |

* cited by examiner

*Primary Examiner* — Brittany N Allen

(74) *Attorney, Agent, or Firm* — Mintz Levin Cohn Ferris Glovsky and Popeo, P.C.

(57) ABSTRACT

A selection of a generator function can be received. The generator function can be configured to be applied to source data to form a normalized tabular indexed data structure. The tabular indexed data structure can include a set of hierarchical attributes. A navigation function can be selected to be applied to the tabular indexed data structure to determine a navigation result. The navigation result can be provided to a user.

18 Claims, 13 Drawing Sheets

FIG. 6

INDEX DATA (602)

| Rank | Tree size | Parent Rank | Level | Node Flags | Parent ID | Node ID |
|---|---|---|---|---|---|---|
| 1 | 10 | 0 | 1 | 0 | null | A1 |
| 2 | 3 | 1 | 2 | 0 | A1 | B1 |
| 3 | 1 | 2 | 3 | 0 | B1 | C1 |
| 4 | 1 | 2 | 3 | 0 | B1 | C2 |
| 5 | 6 | 1 | 2 | 0 | A1 | B2 |
| 6 | 3 | 5 | 3 | 0 | B2 | C3 |
| 7 | 1 | 6 | 4 | 0 | C3 | D1 |
| 8 | 1 | 6 | 4 | 0 | C3 | D2 |
| 9 | 2 | 5 | 3 | 0 | B2 | C4 |
| 10 | 1 | 9 | 4 | 0 | C4 | D3 |

608, 610, 612, 614, 616

SOURCE DATA (606)

| Parent ID | Node ID |
|---|---|
| null | A1 |
| A1 | B1 |
| B1 | C1 |
| B1 | C2 |
| A1 | B2 |
| B2 | C3 |
| C3 | D1 |
| C3 | D2 |
| B2 | C4 |
| C4 | D3 |

Hierarchy traversal in pre-order

604

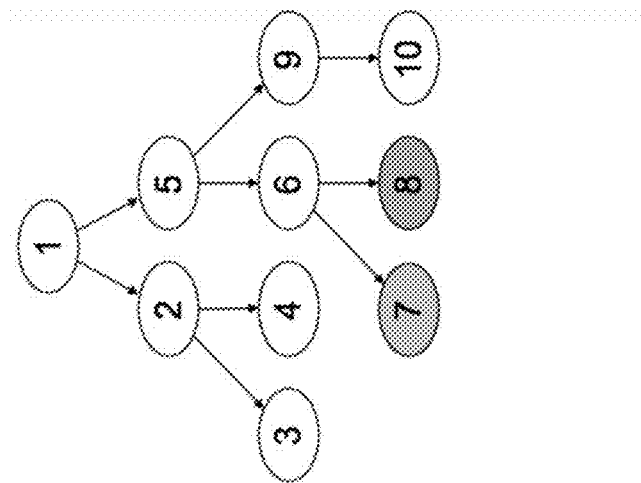
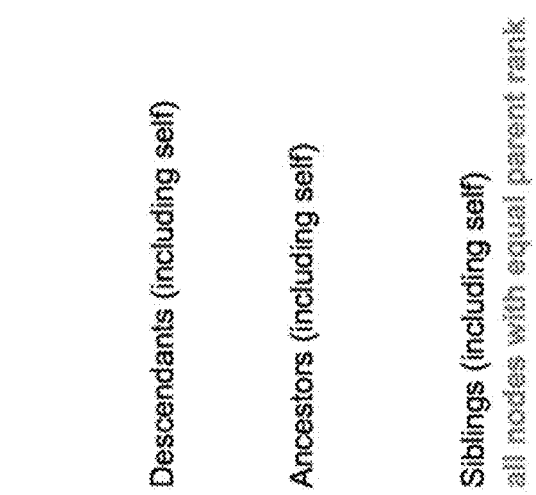
FIG. 10

```
CREATE VIEW h_mini AS SELECT * FROM HIERARCHY( SOURCE h_mini_src );

SELECT * FROM HIERARCHY_DESCENDANTS(
    SOURCE h_mini
    START WHERE node_id = 'B2'
    DISTANCE FROM 1 TO 2
);

SELECT * FROM HIERARCHY_ANCESTORS(
    SOURCE h_mini
    START (
        SELECT hierarchy_rank AS start_rank, node_id AS start_id
        FROM h_mini
        WHERE node_id = 'D2'
    )
    DISTANCE FROM -2 TO -1
);
```

*FIG. 11*

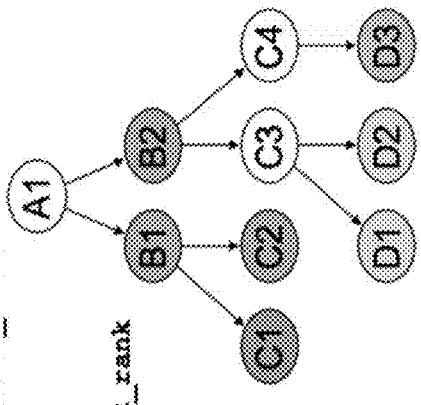

```
WITH
    h_mini AS ( SELECT * FROM HIERARCHY (SOURCE h_mini_src) )
SELECT
    query_node, group_node, node_id AS result_node
FROM HIERARCHY DESCENDANTS (
    SOURCE h_mini START (
        SELECT
            query_node, node_id AS group_node, hierarchy_rank AS start_rank
        FROM HIERARCHY DESCENDANTS (
            SOURCE h_mini START (
                SELECT
                    node_id AS query_node, hierarchy_rank AS start_rank
                FROM h_mini
                WHERE node_id IN ( 'B1', 'B2' )
            )
            DISTANCE TO 1
        )
        WHERE distance = 1 OR is_leaf = 1
    )
)
WHERE is_leaf = 1;
```

FIG. 12

HIERARCHICAL COMPUTATIONS IN RELATIONAL DATABASE MANAGEMENT SYSTEMS

TECHNICAL FIELD

The subject matter described herein relates to performing hierarchical computations in a relational database management system.

BACKGROUND

The demand for ad-hoc and real-time data analyses by many users simultaneously is increasing in the same way that the data quantities to be processed are increasing. To keep pace with the competition in the current economic climate, it is crucial to have the latest information about processes within an organization (e.g. a company) and/or in the market to be able to make the right decisions promptly.

Data can be hierarchical where one superordinate data item may depend on one or many subordinate data items. Operations can be performed on a data hierarchy to glean on or more desired pieces of information about the hierarchical data.

SUMMARY

In one aspect, a method is provided. The method can include one or more of the following operations. A selection of a generator function to be applied to source data can be received. In some variations, the selection of the generator function can be provided through a structured query language format. In some variations the functions can be included in the structure query language layer. The generator function can be applied to the source data to form a normalized tabular indexed data structure. The tabular indexed data structure can include a set of hierarchical attributes.

A navigation function can be selected. The navigation functions can be be applied to the tabular indexed data structure to determine a navigation result. The navigation function can be selected through a structured query language. The navigation function can be included in the structured query language layer.

The navigation result can be provided. The navigation result can be provided to a user, for example, through a display of a client device. In some variations, the navigation result can be provided to one or more applications. Such applications can include database application, third-party applications, client applications, or the like. The one or more applications can use the navigation result(s) in further processing.

In some variations, one or more of the following operations and/or features may optionally be included in the method. The generator function can be a table-valued hierarchy function. The selection of a generator function can include receiving, from a user, a semantic description of the generator function. The generator function can be configured to support a plurality of data formats of the source data. The navigation result can include a distance between a start node of the source data and a results node of the source data. In some variations, the navigation result can include a start condition. The navigation function can include a determination of a tree size, a rank of the source data, a level of a data node, or the like.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 6 is an illustration of index data generated from a hierarchy generated from source data, the hierarchy results generated using one or more functions consistent with the present description;

FIG. 10 is an illustration of determination of siblings in a hierarchy generated by a database having one or more features consistent with the present description;

FIG. 11 is an example of code including a basic query implemented in a database system having one or more features consistent with the present description;

FIG. 12 is an example of code including a complex query implemented in a database system having one or more features consistent with the present description.

DETAILED DESCRIPTION

Figure 1:
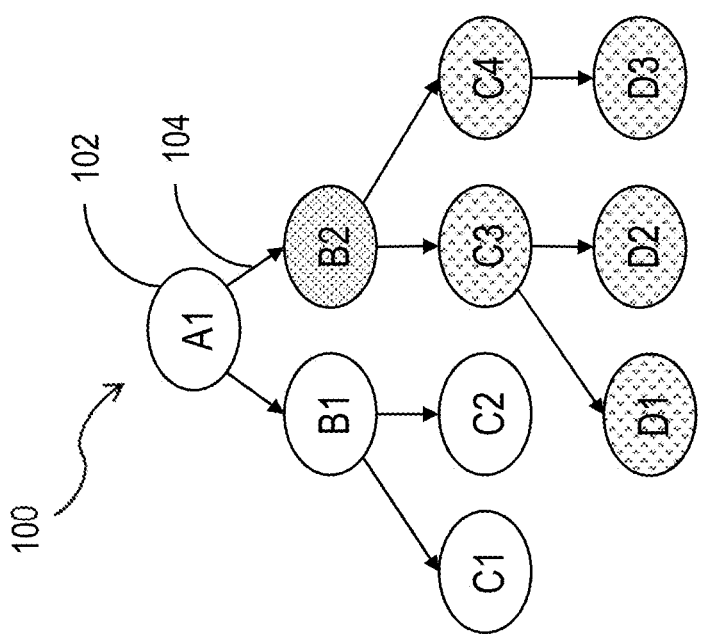
FIG. 1 is an illustration of a tree hierarchy in a database system having one or more features consistent with the present description.

FIG. 1 is an illustration of a tree hierarchy 100 in a database system having one or more features consistent with the present description. A tree hierarchy 100 is a tree-like structure consisting of hierarchy nodes 102. The hierarchy nodes can be connected by edges 104. Except for the start node, A1, each node has a parent node and is, itself, a child of a parent node. For example, node B1 is a child node of node A1, and nodes C1 and C2 are child nodes of node B1. A child node has an effect on the parent node. For example, a parent node may represent an airline alliance and a child node may represent a particular airline. The tree hierarchy 100 represents the logic that the particular airline belongs to the airline alliance. The child node in this case affects the parent node by showing that the particular airline is part of the airline alliance. The airline node may have child nodes indicating aircrafts or routes. Similarly, the airline alliance may have a parent node representing the airline industry, or the like.

Each node 102 can represent a data item that is logically connected to the other nodes that it connects with. For example, node A1 may represent an organization, say a supermarket. Node B1 may represent a region or division of that supermarket. Node C1 may represent an individual store within the region or division represented by node B1.

Tree hierarchies 100 can be generated from relational source data. In some variations, the source data may be one or more database tables, or portions thereof. In other variations, the source data may be the results of one or more queries involving one or more database tables, or portions thereof. Hierarchical source data is usually stored on the database in a format that models the hierarchical structure, but does not include additional index data for fast hierarchical queries, because this index data would need to be consistently updated on modification of the source data with additional cost and programming complexity. Tree hierarchies 100 are particularly useful in comparing alternative solutions to a problem. Tree hierarchies 100 are also useful in facilitating determination of a magnitude of an issue.

Various analytics may be performed on a tree hierarchy 100 to obtain information about the tree hierarchy 100. For example, it may be beneficial to know the distance, or number of nodes, between a start node and a result node. A start node can be the node where you start your analysis and the result node can be the node where you end your analysis. A result node is not necessarily at the end of a branch of the tree of a tree hierarchy 100. In some variations, the result of a particular hierarchy analysis may be limited to a higher-level abstraction of information. For example, if the tree hierarchy 100 represents a supermarket business, the first node, node A1, may represent the supermarket company, and this may be the start node. The tree hierarchy 100 may include nodes that represent individual employees of the supermarket company. However, the analysis may only call for a result node that ends at the individual supermarket level, which may be several levels above that of the individual employee nodes.

Similar analytics are performed on tree hierarchies across many different industries and for many different purposes. Tree hierarchies may be populated using inconsistently formatted source data and/or from diverse source topologies. The source data may include "corner cases" which are cases where the node relations as given by the source data do not follow the classic tree topology. To analyze such source data, a developer would be required to understand each of the "corner cases," the formatting of each of the source data, the topologies of each of the source data, and account for those issues when developing hierarchy functions.

The presently described subject matter provides a set of hierarchy functions that can account for "corner cases," different source topologies, different source data formats, or the like, negating the need for a developer to account for each issue. Consequently, a developer need only provide semantic statements when developing custom hierarchy functions.

A database system can include multiple tables. A table is a collection of related data held in a structured format within a database. A table typically consists of fields, or columns, and rows. In some variations, the cells of the table may include database commands linking to data that is held externally to the database.

A database system can typically include a database management system. The database management system can comprise multiple layers or levels. The different layers can be configured to perform different types of operations. For example, the lowest layer, or physical layer, of a database management system can be configured to perform the actual operations requested by the users of the database management system. At the physical layer, a conceptual instruction provided by a user may have been translated into many instructions that are readable by the database.

A middle layer, or logical layer, can be configured to consolidate external concepts and instructions into an intermediate data structure. The intermediate data structure can be capable of being devolved into the physical instructions for implementation at the physical layer. The logical layer can be configured to provide execution pathways of operations to multiple different databases and/or database tables, in response to instructions received from the top layer, or view layer.

The view layer can be configured to implement applications that are provided to users of the database management system. Database operations can be represented as database access. In some variations, individual databases within a database system can be viewed as the same at this layer, despite differences in content and operation of those individual databases.

In some variations, the view layer can be a calculation engine layer. The calculation engine layer can be configured to facilitate the processing of user queries and requests using diverse calculation operations. When processing queries, having the tables loaded into the main memory of the database management system increases the efficiency at which the database management system can execute queries, improving the optimization of the database management system.

The view layer and the calculation engine layer can be configured to generate tree hierarchies from the underlying source data. Both layers can be configured to facilitate execution of one or more hierarchy functions that facilitate navigating the hierarchy, obtaining information about the hierarchy, or the like.

Figure 2:
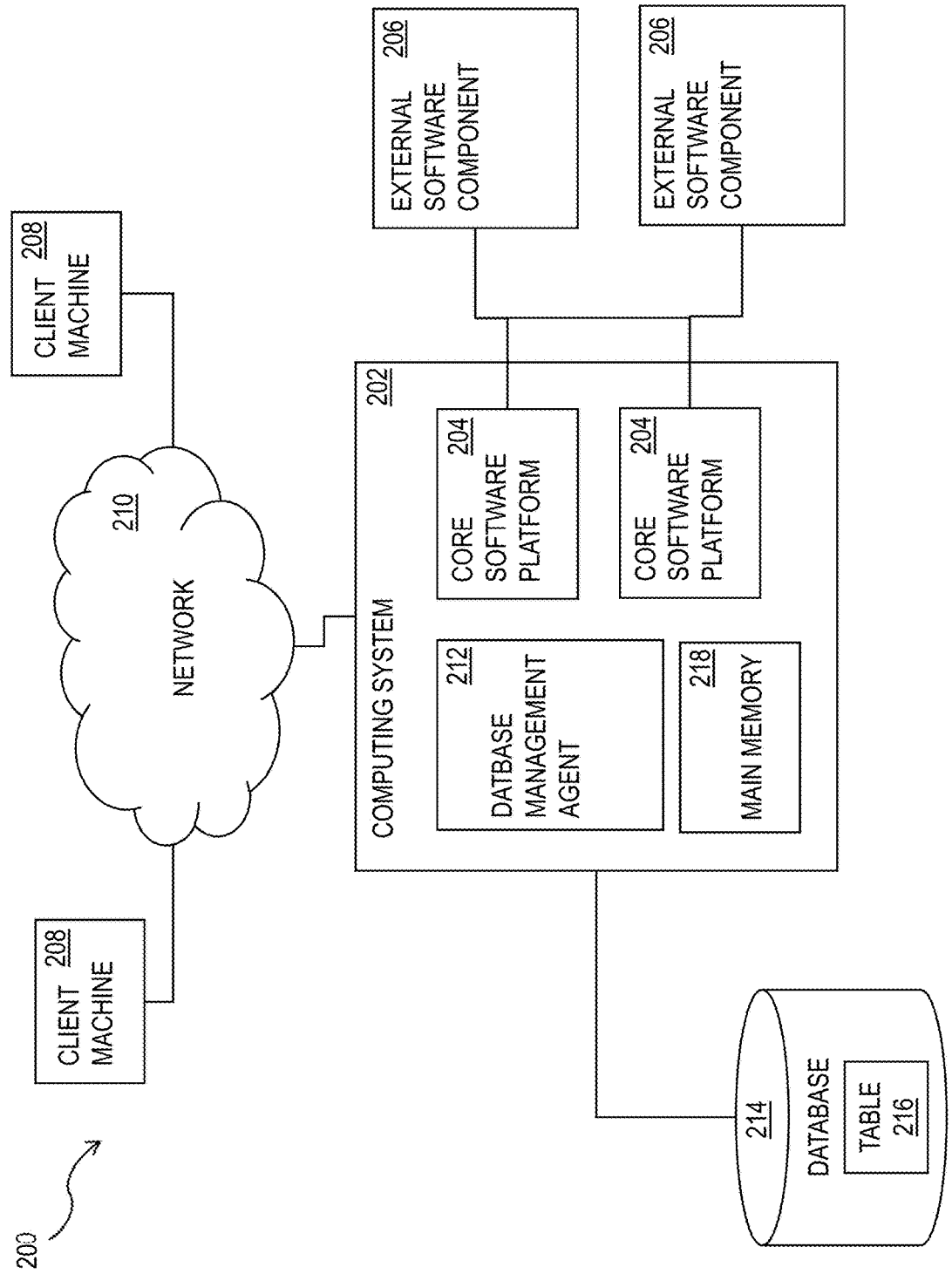
FIG. 2 is a diagram of a system that can implement one or more features consistent with the present description.

FIG. 2 shows a diagram of a system 200 that can implement one or more features consistent with the present description. A computing system 202 can include one or more core software platform modules 204 providing one or more features of a business software system or other software that includes database management features. The computing system can also aggregate or otherwise provide a gateway via which users can access functionality provided by one or more external software components 206. One or more client machines 208 can access the computing system, either via a direct connection, a local terminal, or over a network 210 (e.g. a local area network, a wide area network, a wireless network, the Internet, or the like).

A database management agent 212 or other comparable functionality can access a database 214 that includes at least one table 216, which can in turn include at least one column. The database management agent 212 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

The database management agent 212 or other comparable functionality can be configured to load a database table 216, or other comparable data set, into the main memory 218. The database management agent 212 can be configured to load the information from the database 214 to the main memory 218 in response to receipt of a query instantiated by a user or computer system through one or more client machines 208, external software components 206, core software platforms 204, or the like. The core software platform(s) 204 can be configured to facilitate generation of a hierarchy based on a query and/or from one or more tables, or parts thereof, of the database 214 loaded into the main memory 218. The core software platforms(s) 204 can be configured to perform hierarchy functions to facilitate navigation through the hierarchy and/or perform analytics on the hierarchy.

Figure 3:
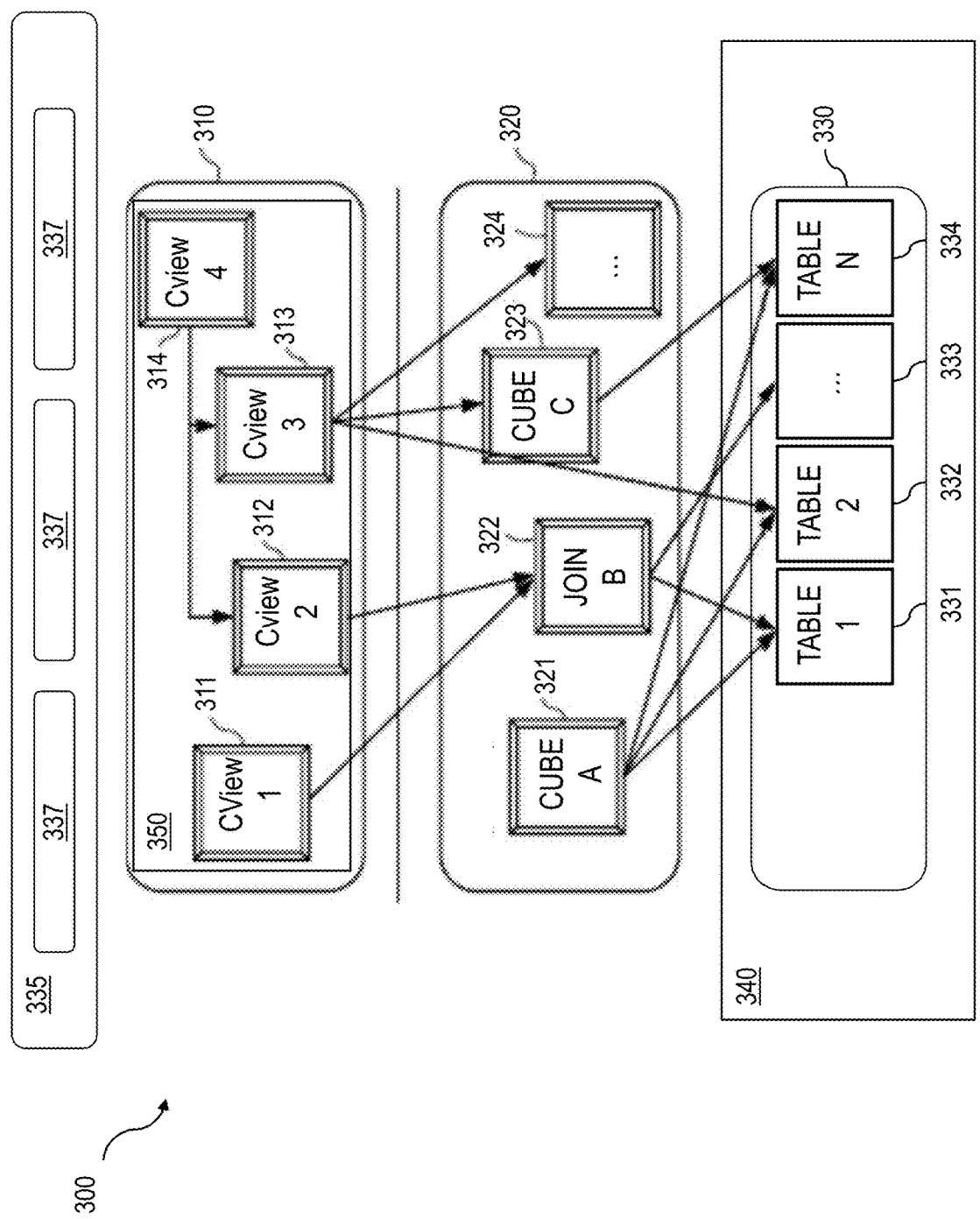
FIG. 3 is a diagram of a computing architecture implemented in a database system having one or more features consistent with the present description.

FIG. 3 is a diagram that illustrates a computing architecture 300 implemented in a database system having one or more features consistent with the present description. The computing architecture 300 can include a database system that includes three layers: a top layer, calculation engine layer 310, an intermediate layer, or logical layer 320, and a top layer, or physical table-pool 330. One or more application servers 335 implementing database client applications 337 can access the database system 200, as shown in FIG. 2. Calculation scenarios can be executed by a calculation engine, which can form part of a database or which can be part of the calculation engine layer 310 (which is associated with the database). The calculation engine layer 310 can be based on and/or interact with the other two layers, the logical layer 320 and the physical table pool 330. In some variations, the physical table pool 330 can comprise database operations configured to access and perform the database operations on the individual tables. In some variations, the basis of the physical table pool 330 consists of physical tables (called indexes) containing the data, which can be stored on one more database servers 340. Various tables 331-334 can be joined using logical metamodels 321-324 defined by the logical layer 320 to form an index. For example, the tables 331-334 in a cube (e.g. an online analytical processing or "OLAP" index) can be assigned roles (e.g., fact or dimension tables) and joined to form a star schema. It is also possible to form join indexes (e.g. join index B 322 in FIG. 3), which can act like database views in computing environments such as the Fast Search Infrastructure (FSI) available from SAP SE of Walldorf, Germany. Hierarchy functions can be configured to define hierarchical relations and to process source data from the physical table layer 330, from the logical layer 320, and the calculation layer 310. Hierarchy functions can also be called from the calculation layer 310.

A calculation scenario 350 can include individual nodes (e.g. calculation nodes) 311-314, which in turn can each define operations such as joining various physical or logical indexes and other calculation nodes (e.g., CView 4 is a join of CView 2 and CView 3). That is, the input for a node 311-314 can be one or more physical, join, or OLAP indexes or calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

Figure 4:
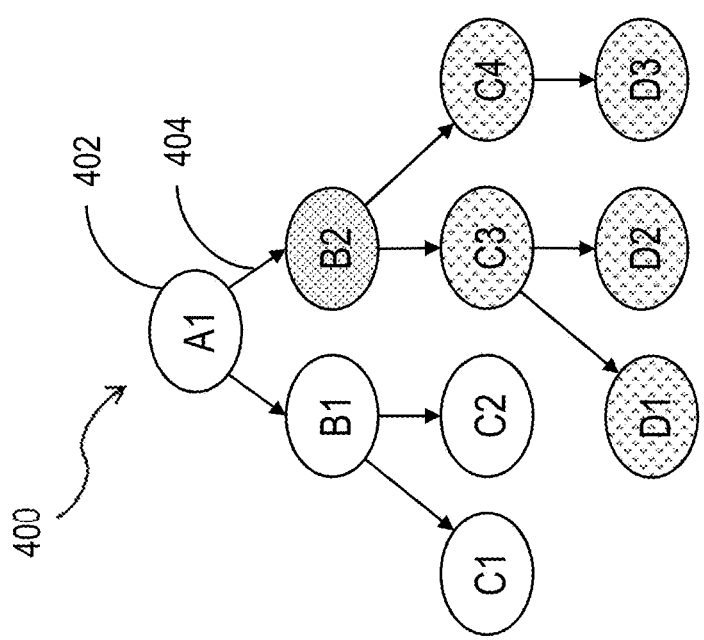
FIG. 4 is a diagram of a hierarchy generated by a database system having one or more features consistent with the present description.

FIG. 4 illustrates a hierarchy 400 generated by a database system having one or more features consistent with the present description. The hierarchy 400 can include data nodes 402 and edges 404 connecting the data nodes 400. In some variations, in a database system operated by an organization, hierarchies can operate directly on real-world transactional organization data. Hierarchies preferably need to be capable of handling diverse source data formats. For example, one set of source data may include information about an airline alliance having a plurality of airlines in its membership in a format that supports maintenance of airlines. Another set of source data may include airline employee information in a format that supports payroll activities. These formats may be different and a hierarchy that includes the airline alliance, airlines, and airline employees needs to be able to handle the diverse data formats.

Figures 5A, 5B:
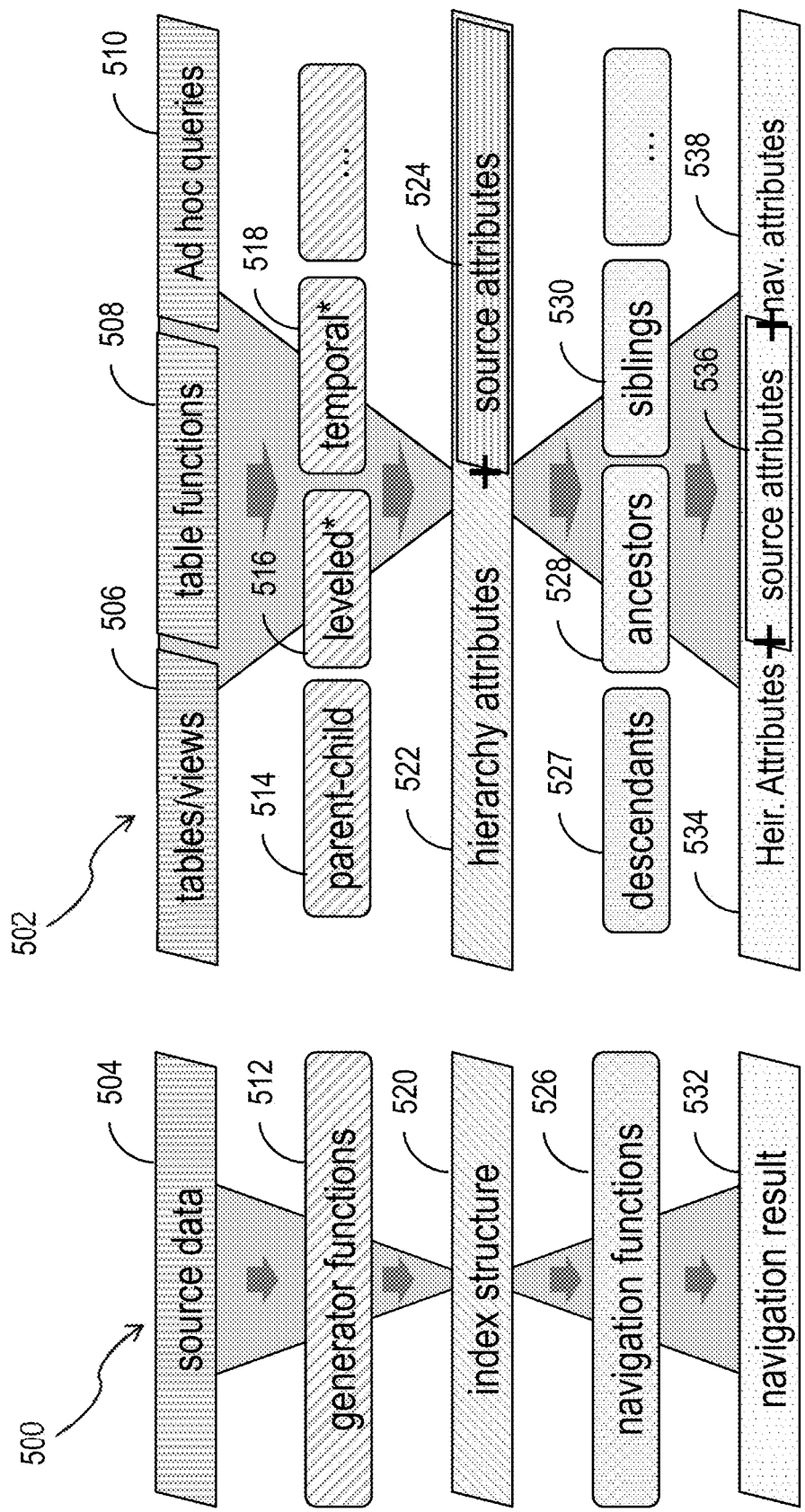
FIG. 5A is a schematic diagram of an overall design for hierarchical computations in a relational database management system having one or more features consistent with the present description.
FIG. 5B is a schematic diagram of an overall data flow for the hierarchical computations of the design illustrated in FIG. 5A.

Hierarchy sources can have a treelike topology, where each parent data node, such as node A1, has one or more child data nodes, for example, nodes B1 and B2, as shown in FIG. 5A. The topology of relations as given by the source data can alternatively be non-treelike. For example, a role-based information access model of a company may consist of several top-level business roles (technical, financial, operational, executive, marketing . . . ) and respective subordinate roles. A particular piece of information (such as a memo, a patent, a chemical formula) is attributed to one or more of these role nodes, thereby giving access to it to any person having one of these role nodes or one of the superordinate role nodes. The overall topology consists of an interwoven mesh of many trees. Hierarchies also preferably need to be able to handle unclean source data, where the source data may have incomplete or incorrect data that may cause errors to be present in the hierarchy. Such unclear source data, non-treelike topologies, diverse data formats, or the like, may be referred to as "corner cases."

It is desirable to have a database system that is configured to allow database developers to use hierarchy functions without the need to have domain-specific knowledge on efficient implementation of such functions. Furthermore, it is desirable to have a database system that avoids manual recursive processing and calculation of hierarchy attributes.

Recursive hierarchies are hierarchies in which all levels of data are from the same data table or view (or generated from the same query), and the parent-child relationships between the levels are defined in the same source table. In other words, in the simplest case a recursive hierarchy is a generic two-column table, with one column of the table representing the parent references and the other column representing the node identifiers. In a more complex case both a node identifier and a parent node reference may consist of multiple columns having the same format for node identifier and parent reference. Recursive hierarchy processing includes the process by which a relationship table is generated that contains the parent-child relationships for not only direct children of a parent data node, but also the indirect children of a parent data node in the hierarchy. It is also desirable for hierarchies to support ad hoc queries.

Each data node of a hierarchy has a standardized set of calculated hierarchy attributes. The preorder rank attribute of the hierarchy node serves as primary unique node identifier (ID). If applicable, the parent rank uniquely identifies the parent node by its preorder rank. The level attribute describes a node's distance to its root node. The tree size provides information about the number of subordinate nodes, including the node itself. Depending on the generation function, a hierarchy node may contain additional attributes such as the source node and parent reference, source level name, node flags, user-defined attributes, or the like.

FIG. 5A is a schematic diagram showing an overall design 500 for hierarchical computations in a relational database management system having one or more features consistent with the present description. FIG. 5B is a schematic diagram 502 showing an overall data flow for the hierarchical computations of the design 500 illustrated in FIG. 5A.

The design 500 provides for the separation of hierarchy functions into individual processing steps that each have clearly defined tasks. For example, at the source data step 504 a user can semantically describe the source structure. This is instead of a user having to define an algorithm used to calculate hierarchical attributes. The user can semantically describe the tables or views 506, the table functions 508, any ad hoc queries 510, or the like. The source data step 504 can include support for various source data formats. The source data step 504 can be designed to take extensibility into consideration.

At the generator functions step 512, one or more hierarchical relationships can be generated. For example, parent-child relationships 514 can be defined, whether the hierarchy is leveled 516 can be defined, whether the hierarchy is temporal 518 can be defined, or the like. The generator functions 512 can be provided in an extensible layer configured to facilitate the addition of other generator functions. Users of the database system can build their own generator functions.

The index structure 520 can include a normalized tabular index structure can be provided. The index structure 520 can consist of a single tabular structure having mixed semantics encoding both edge and vertex information, subsumed by the general concept of hierarchy node information. The index structure 520 can include an abstraction and/or normalization layer for each of the source formats supported by the hierarchy design 500. The index structure 520 can include a minimal set of default hierarchical attributes 522. Hierarchical attributes 522 can include the rank of a node, the level of a node, the tree size of the hierarchy, the number of child nodes, or the like. The index structure 520 can include variable user-definable projection of source attributes 524. The source attributes 524 can include node ID, parent node reference, and/or one or additional variable user-defined attributes. For example, an employee hierarchy source table may contain additional general employee attributes such as age, address, work title, and so on.

The navigation functions 526 can consume the index structure 520. The navigation functions 526 typically operate only on the hierarchical attributes 522 of the index structure 520, but are usually capable of laterally appending all input attributes to the function output. The navigation functions 526 can include a set of specialized functions for hierarchy navigation. The navigation functions 526 can include one or more filters, including a distance filter, a leaves filter, a branch filter, or the like. The hierarchy functions 526 can facilitate traversal of the hierarchy in an arbitrary direction. The hierarchy functions 526 can facilitate chaining by nesting nodes. The hierarchy functions 526 can be configured to inspect start conditions of the hierarchy traversal. Users of the database system can build their own navigation functions 526. Navigation functions 526 can be associated with descendants 527, ancestors 528, siblings 530, or the like.

The navigation result 532 can be provided. The navigation result 532 can include the distance between a start node and a result node of a traversal of the hierarchy. The navigation result 532 can facilitate determination of how a particular node was reached based on the start conditions of the hierarchy traversal. The navigation result 532 can include one or more of hierarchical attributes 534, source attributes 536, navigation attributes 538, or the like.

FIG. 6 illustrates index data 602 generated from a hierarchy 604 generated from source data 606, the hierarchy results generated using one or more functions consistent with the present description. The index data 602 can include a rank 608 of each node, for example, node A1 has rank 1, node B1 has rank 2, node C1 has rank 3, node C2 has rank 4, node B2 has rank 5, node C3 has rank 6, node D1 has rank 7, node D2 has rank 8, node C4 has rank 9 and node D3 has rank 10. The index data 602 can include a tree size 610. A tree size for each node can include the total number of child-nodes descending from it plus the node itself. The tree size for node A1 is 10, whereas the tree size for node C3 is 3. The index data 602 can include a rank of the parent of the node. The index data 602 can include a level 714 of the nodes. The level 714 of the nodes can be the level of the nodes in the hierarchy. The index data 602 can include node flags 716.

Figure 7:
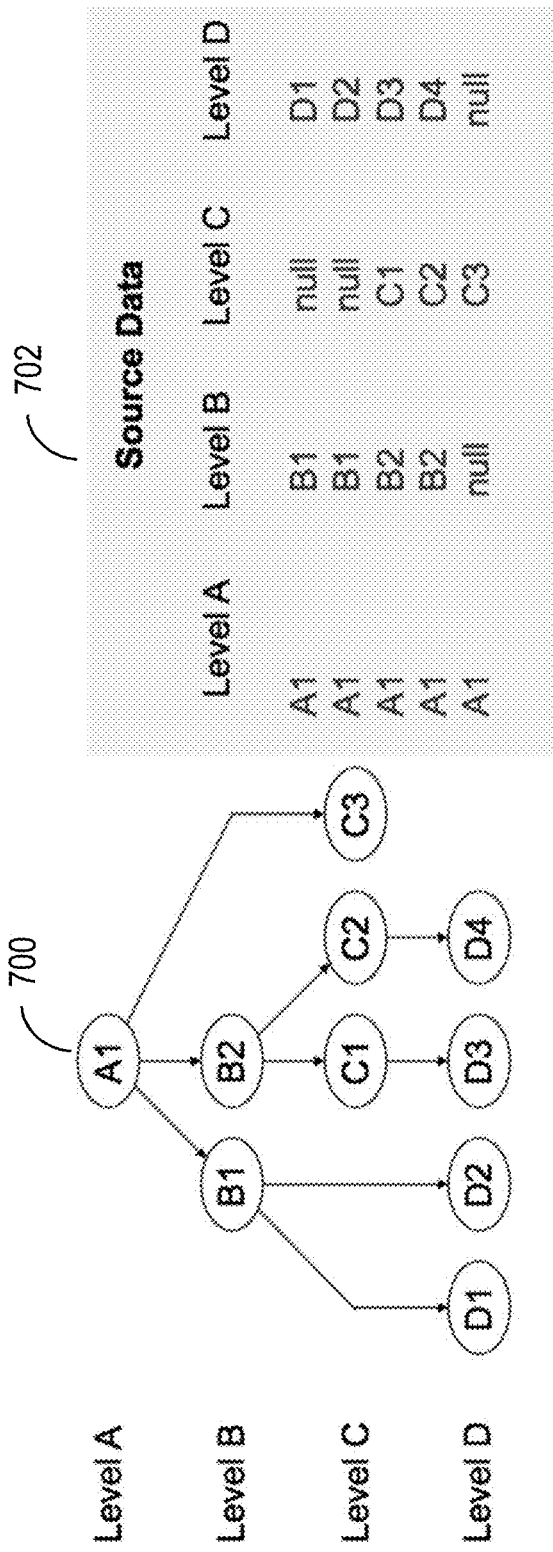
FIG. 7 is an illustration of a hierarchy generated, from source data having a leveled format, from a database system having one or more features consistent with the present description.

FIG. 7 is an illustration of a hierarchy 700 generated, from source data having a leveled format, from a database system having one or more features consistent with the present description. A hierarchy 700, generated from source data having a leveled format, each source row describes a unique path from a root node to a leaf node. The hierarchy 700, described by source data having a leveled format, is always a well-formed tree without requiring special corner case processing.

Figure 8:
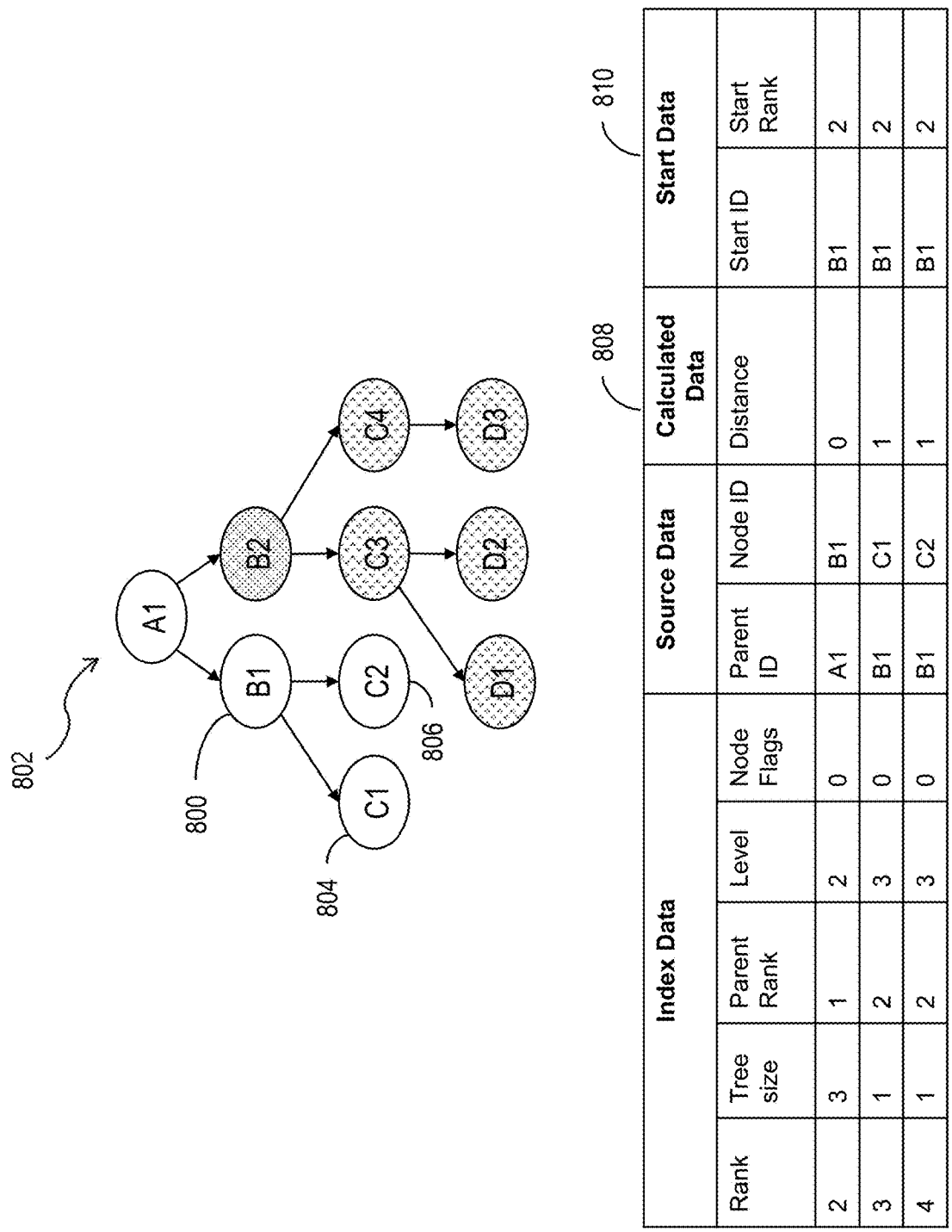
FIG. 8 is an illustration of descendant information of a node of a hierarchy.

FIG. 8 is an illustration of descendant information of a node 800 of a hierarchy 802. The nodes that descend from node 800 include nodes 804 and 806. The descendant information of a node can include calculated data. Calculated data can include a distance 808 between a start node and an end node. The descendant information of a node can include start data 810, including a start ID and Start Rank.

Figure 9:
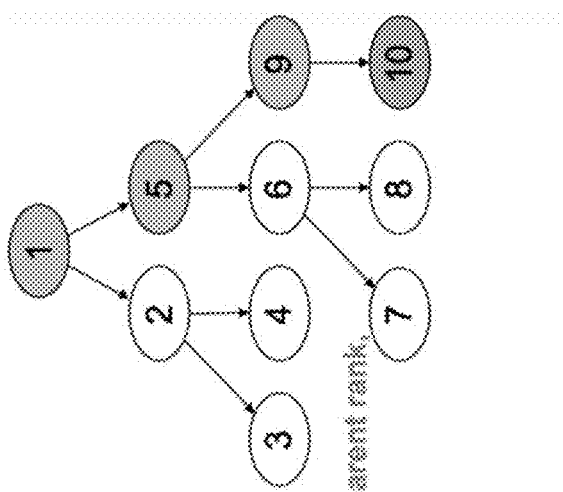
FIG. 9 is an illustration of determination of ancestors in a hierarchy generated by a database having one or more features consistent with the present description.

FIG. 9 is an illustration of determination of ancestors in a hierarchy generated by a database having one or more features consistent with the present description. For example, the hierarchy functions can be configured to start with the query node, or result node, and work backwards until the start node. At each stage, the hierarchy functions can be configured to jump back to the parent node. As illustrated node number 10 has ancestors of node number 9, node number 5 and node number 1.

FIG. 10 is an illustration of determination of siblings in a hierarchy generated by a database having one or more features consistent with the present description. For example, the siblings in a hierarchy include all nodes that have equal parent rank.

FIG. 11 is an example of a structured query language interface showing a basic query implemented in a database system having one or more features consistent with the present description. Each individual function can be called within a SELECT command. The default set of functions requires at least a SOURCE parameter to be defined by the caller specifying the source data.

FIG. 12 is an example of code including a complex query implemented in a database system having one or more features consistent with the present description. The example of the complex query illustrated in FIG. 13 includes nested functions.

FIG. 11 and FIG. 12 show that the functions can be used by the developer to semantically describe the hierarchical relation and the navigation, rather than the developer having to develop algorithms to perform the functions.

Figure 13:
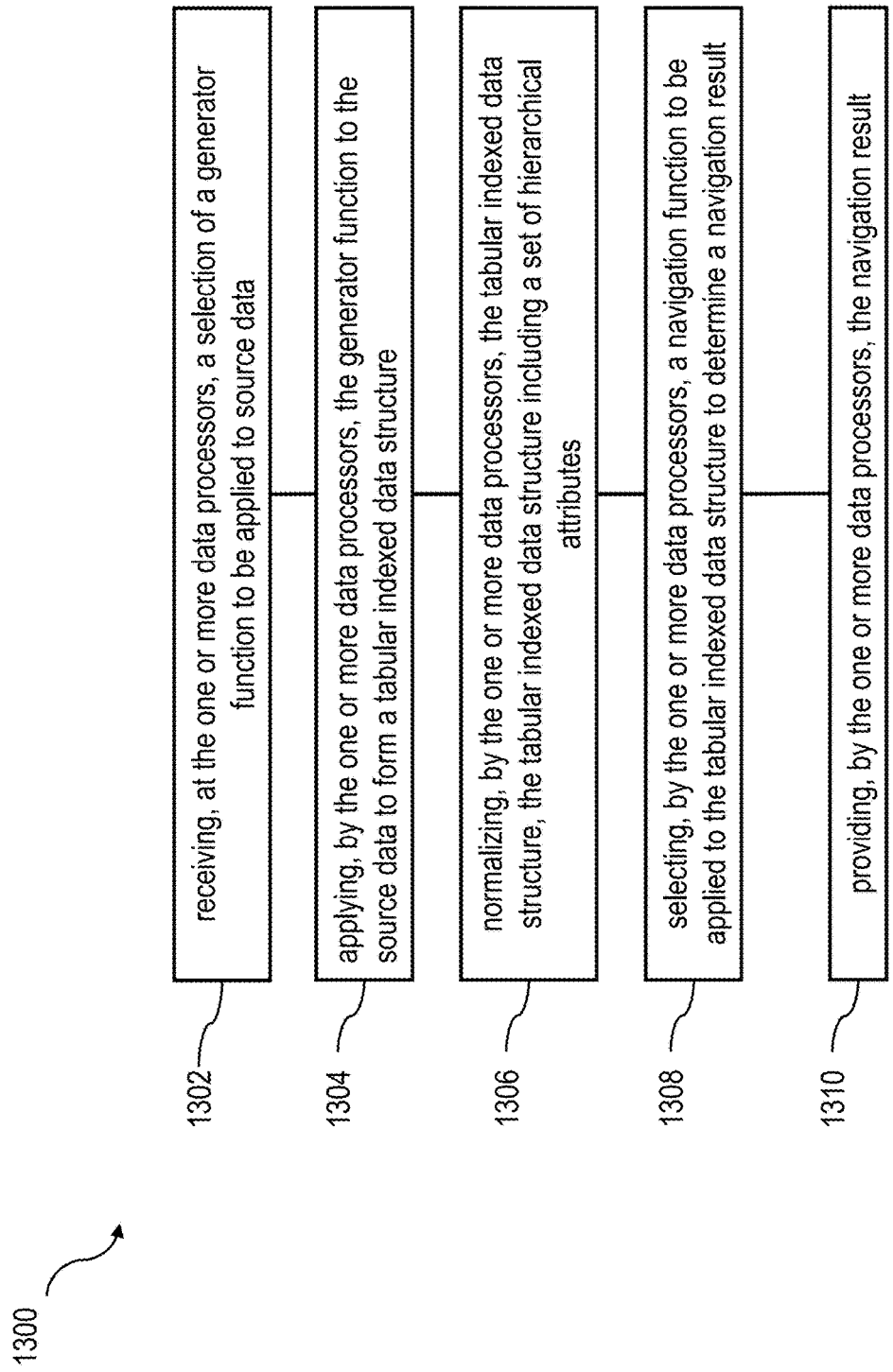
FIG. 13 is a process flow diagram illustrating a method having one or more features consistent with the present description.

FIG. 13 is a process flow diagram 1400 illustrating a method having one or more features consistent with the present description.

At 1302, a selection of a generator function to be applied to source data can be received at the one or more data processors. The selection can be by a user providing semantic descriptions of the generator functions. The generator function can be a table-valued hierarchy function. Selection of a generator function can include receiving, from a user, a semantic description of the generator function. The generator function can be configured to support a plurality of data formats of the source data.

At 1304, the generator function can be applied, by the one or more data processors, to the source data. Applying the generator function to the source data can form a normalized tabular indexed data structure. The tabular indexed data structure can include a set of hierarchical attributes.

At 1306, a navigation function can be selected that is to be applied to the tabular indexed data structure. The navigation function can facilitate determination of a navigation result. The navigation result can include a distance between a start node of the source data and a results node of the source data. The navigation result can include a start condition. The navigation function can include a determination of a tree size, a rank of the source data, or a level.

At 1308, the navigation result can be provided to the user. The navigation result can be provided through a display of a client device associated with the user. In some variations, the navigation result can be provided to one or more database application, client applications, third-party applications, or the like to be used in further processing by the application(s).

Without in any way limiting the scope, interpretation, or application of the claims appearing herein, a technical effect of one or more of the example embodiments disclosed herein may include providing an operation that may facilitate navigation of hierarchies without requiring database developers to implement algorithms to perform hierarchy analysis. Consequently, the presently described subject matter may increase the efficiency of the database management system by allowing database developers to define generator and navigation functions by semantics and reducing possible errors in the database system.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method to be performed on one or more data processors comprising at least part of a computer system, the method comprising:
   receiving, at the one or more data processors, a selection of a generator function of a hierarchal model, the generator function to be applied to source data, the source data comprising hierarchical relationship data corresponding to parent-child relationships, the hierarchical relationship data comprising logical connections within the source data;
   generating, by the one or more data processors, a tree hierarchy based at least in part on the hierarchical relationship data corresponding to parent-child relationships;
   applying, by the one or more data processors, the generator function to the source data to form a normalized tabular indexed data structure corresponding to the tree hierarchy, the normalized tabular indexed data structure including a set of hierarchical attributes including a rank, a tree size, a parent node rank, and a level in the tree hierarchy;
   selecting, by the one or more data processors, a navigation function of the hierarchal model, the navigation function to be applied to the set of hierarchical attributes including the rank, the tree size, the parent node rank, and the level to determine a navigation result comprising a distance between nodes of the normalized tabular indexed data structure corresponding to the tree hierarchy; and
   providing, by the one or more data processors, the navigation result by at least appending the distance between nodes to the normalized tabular indexed data structure.

2. The method of claim 1, wherein the generator function is a table-valued hierarchy function.

3. The method of claim 1, wherein the selection of the generator function includes receiving, from a user, a semantic description of the generator function.

4. The method of claim 1, wherein the generator function is configured to support a plurality of data formats of the source data.

5. The method of claim 1, wherein the distance is between a start node of the source data and a results node of the source data.

6. The method of claim 1, wherein the navigation result includes a start condition.

7. A system comprising:
   at least one processor; and
   at least one memory configured to store computer-readable instructions, which, when executed by the at least one processor, cause the at least one processor to perform one or more operations, the operations comprising:
   receiving, at the one or more data processors, a selection of a generator function of a hierarchal model, the generator function to be applied to source data, the source data comprising hierarchical relationship data corresponding to parent-child relationships, the hierarchical relationship data comprising logical connections within the source data;
   generating, by the one or more data processors, a tree hierarchy based at least in part on the hierarchical relationship data corresponding to parent-child relationships;
   applying, by the one or more data processors, the generator function to the source data to form a normalized tabular indexed data structure corresponding to the tree hierarchy, the normalized tabular indexed data structure including a set of hierarchical attributes including a rank, a tree size, a parent node rank, and a level in the tree hierarchy;
   selecting, by the one or more data processors, a navigation function of the hierarchal model, the navigation function to be applied to the set of hierarchical attributes including the rank, the tree size, the parent node rank, and the level to determine a navigation result comprising a distance between nodes of the normalized tabular indexed data structure corresponding to the tree hierarchy; and
   providing, by the one or more data processors, the navigation result by at least appending the distance between nodes to the normalized tabular indexed data structure.

8. The system of claim 7, wherein the generator function is a table-valued hierarchy function.

9. The system of claim 7, wherein the selection of the generator function includes receiving, from a user, a semantic description of the generator function.

10. The system of claim 7, wherein the generator function is configured to support a plurality of data formats of the source data.

11. The system of claim 7, wherein the distance is between a start node of the source data and a results node of the source data.

12. The system of claim 7, wherein the navigation result includes a start condition.

13. A non-transient computer readable medium containing program instructions which, when executed by at least one processor, cause the at least one processor to perform one or more operations, the operations comprising:
   receiving, at the one or more data processors, a selection of a generator function of a hierarchal model, the generator function to be applied to source data, the source data comprising hierarchical relationship data corresponding to parent-child relationships, the hierarchical relationship data comprising logical connections within the source data;

generating, by the one or more data processors, a tree hierarchy based at least in part on the hierarchical relationship data corresponding to parent-child relationships;

applying, by the one or more data processors, the generator function to the source data to form a normalized tabular indexed data structure corresponding to the tree hierarchy, the normalized tabular indexed data structure including a set of hierarchical attributes including a rank, a tree size, a parent node rank, and a level in the tree hierarchy;

selecting, by the one or more data processors, a navigation function of the hierarchal model, the navigation function to be applied to the set of hierarchical attributes including the rank, the tree size, the parent node rank, and the level to determine a navigation result comprising a distance between nodes of the normalized tabular indexed data structure corresponding to the tree hierarchy; and providing, by the one or more data processors, the navigation result by at least appending the distance between nodes to the normalized tabular indexed data structure.

14. The non-transient computer readable medium of claim 13, wherein the generator function is a table-valued hierarchy function.

15. The non-transient computer readable medium of claim 13, wherein the selection of the generator function includes receiving, from a user, a semantic description of the generator function.

16. The non-transient computer readable medium of claim 13, wherein the generator function is configured to support a plurality of data formats of the source data.

17. The non-transient computer readable medium of claim wherein the distance is between a start node of the source data and a results node of the source data.

18. The non-transient computer readable medium of claim 13, wherein the navigation result includes a start condition.

* * * * *

UNITED STATES PATENT AND TRADEMARK OFFICE
CERTIFICATE OF CORRECTION

PATENT NO. : 10,872,094 B2
APPLICATION NO. : 15/364205
DATED : December 22, 2020
INVENTOR(S) : Gerald Franz et al.

Page 1 of 1

It is certified that error appears in the above-identified patent and that said Letters Patent is hereby corrected as shown below:

On the Title Page

Item (54) and in the Specification, Column 1, Lines 1-3, in "Title", insert --DESIGN FOR-- at the beginning of the title.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*